United States Patent
Chen et al.

(10) Patent No.: US 6,622,338 B1
(45) Date of Patent: Sep. 23, 2003

(54) AUTOMATIC DEVICE FOR RETRACTABLY MOVING A WINDSHIELD WIPER ARM AWAY FROM A WINDSHIELD

(76) Inventors: Ming-Hui Chen, No. 40, Lane 457, Chu-Kuang Rd., Yuan-Lin Township, Chang-Hua Hsien (TW); Hsiang-Jung Chang, No.4, Lane 593 Chung-Shan Rd., Tao-Yuan City (TW)

( * ) Notice: Subject to any disclaimer, the term of this patent is extended or adjusted under 35 U.S.C. 154(b) by 0 days.

(21) Appl. No.: 10/039,107
(22) Filed: Jan. 8, 2002
(51) Int. Cl.[7] .................................................. B60S 1/32
(52) U.S. Cl. ............................. 15/250.19; 15/250.351; 15/250.16
(58) Field of Search ..................... 15/250.19, 250.001, 15/250.202, 250.203, 250.351, 250.16, 250.17, 257.01

(56) References Cited

U.S. PATENT DOCUMENTS 2,784,438 A * 3/1957 Petersen .................. 15/250.19
5,571,221 A * 11/1996 Kuo et al. ................ 15/250.19
6,129,093 A * 10/2000 Kelly ....................... 15/250.19
6,286,175 B1 * 9/2001 Lee ......................... 15/250.19

FOREIGN PATENT DOCUMENTS

| DE | 3731921 | * | 12/1988 | ............. 15/250.19 |
| EP | 0812744 | * | 12/1989 | ............. 15/250.19 |
| JP | 5-162616 | * | 6/1993 | ............. 15/250.19 |

* cited by examiner

Primary Examiner—Gary K. Graham
(74) Attorney, Agent, or Firm—Harrison & Egbert

(57) ABSTRACT

A windshield wiper arm of the motor vehicle is provided with a device including a first power interruption switch, a second power interruption switch, a relay, a motor, a gear set, a push red, and a protruded rod. When the push rod is driven to move in a vertical direction, the windshield wiper arm is pushed to move away from the windshield of the motor vehicle which is not in operation. As the motor vehicle is activated, the push rod is driven to return to a horizontal position thereof, thereby causing the windshield wiper arm to be retracted in place.

1 Claim, 9 Drawing Sheets

AUTOMATIC DEVICE FOR RETRACTABLY MOVING A WINDSHIELD WIPER ARM AWAY FROM A WINDSHIELD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a windshield wiper arm, and more particularly to a device for moving the windshield wiper arm automatically and retractably away from the windshield.

BACKGROUND OF THE INVENTION

The windshield wiper arm is provided with a blade of rubber and the like to scrape water from a windshield. The blade of the windshield wiper arm is in contact with the windshield time after time. The dust is apt to deposit on the windshield wiper arm or blade. As the windshield wiper is moved back and forth across the windshield surface, the dust particles are bound to scratch the windshield surface. In addition, the windshield is susceptible to the heat build-up which is brought about by the sunlight, especially in the hot summer. The windshield wiper arm or blade is therefore vulnerable to deformation which is caused by the hot windshield.

BRIEF SUMMARY OF THE INVENTION

The primary objective of the present invention is to provide a windshield wiper with an automatic device capable of moving retractably the windshield wiper away from the windshield of motor vehicle at the time when the motor vehicle is not in operation. As the motor vehicle is in operation again, the windshield wiper is retracted in place.

The features and the advantages of the present invention will be readily understood upon a thoughtful deliberation of the following detailed description of the present invention with reference to the accompanying drawings.

DETAILED DESCRIPTION OF THE INVENTION

Figure 1:
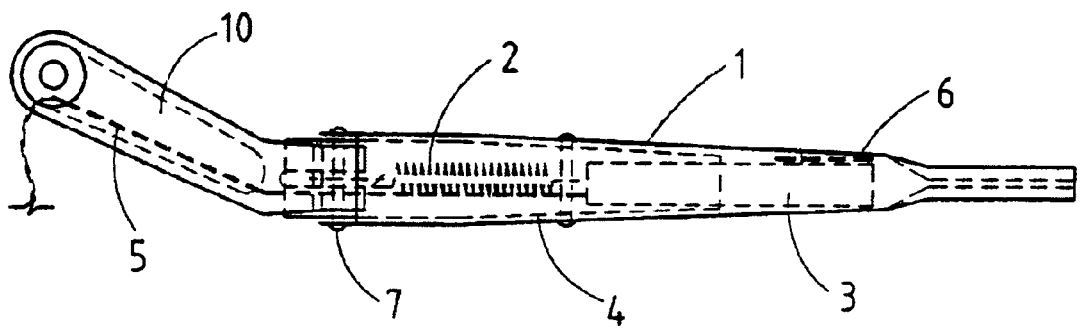
FIG. 1 shows a perspective view of the present invention.

As shown in all drawings provided herewith, a windshield wiper arm 1 of the present invention is used to scrape water from the windshield of a motor vehicle and is fastened at one end with a windshield wiper base 10. The windshield wiper arm 1 is provided in the interior with a spring 2, and a support frame 4 for mounting an automatic device 3 capable of moving the windshield wiper arm 1 retractably away from the windshield of the motor vehicle. The support frame 4 is pivoted at one end to the windshield wiper base 10 by a pivot 7.

The device 3 comprises a relay 14, a direct current motor 15, and two power interruption switches 11 and 12. The relay 14 is controlled by a starting switch 17 of the motor vehicle. The rotational direction of the motor 15 can be thus changed. A gear set 20 and a push rod 6 are provided such that a protruded rod 13 is caused by the gear set in motion to make contact with one of the two power interruption switches 11 and 12. The device 3 is provided with a plastic cover 16, a power source wire and a control wire 5.

Figure 2:
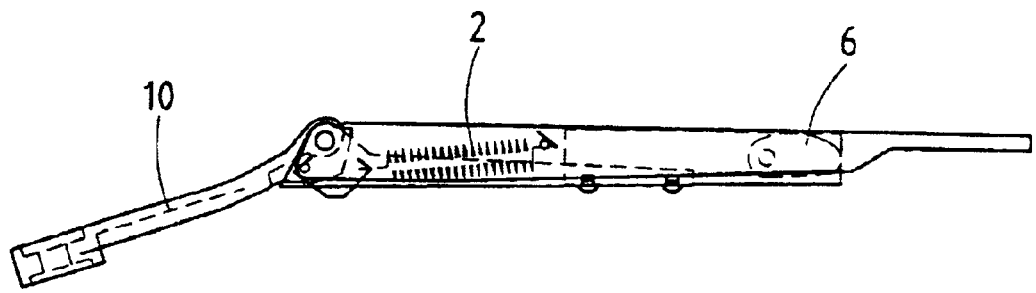
FIG. 2 shows a schematic view of the present invention in retraction state.
Figure 3:
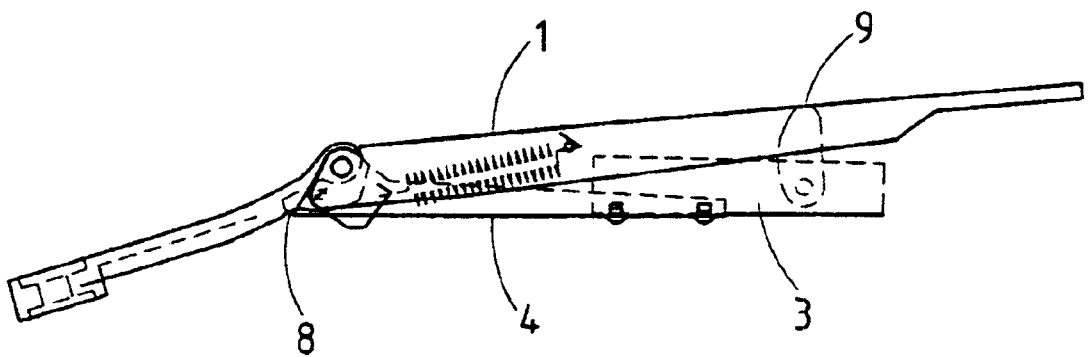
FIG. 3 shows a schematic view of the present invention in extraction state.
Figure 4:
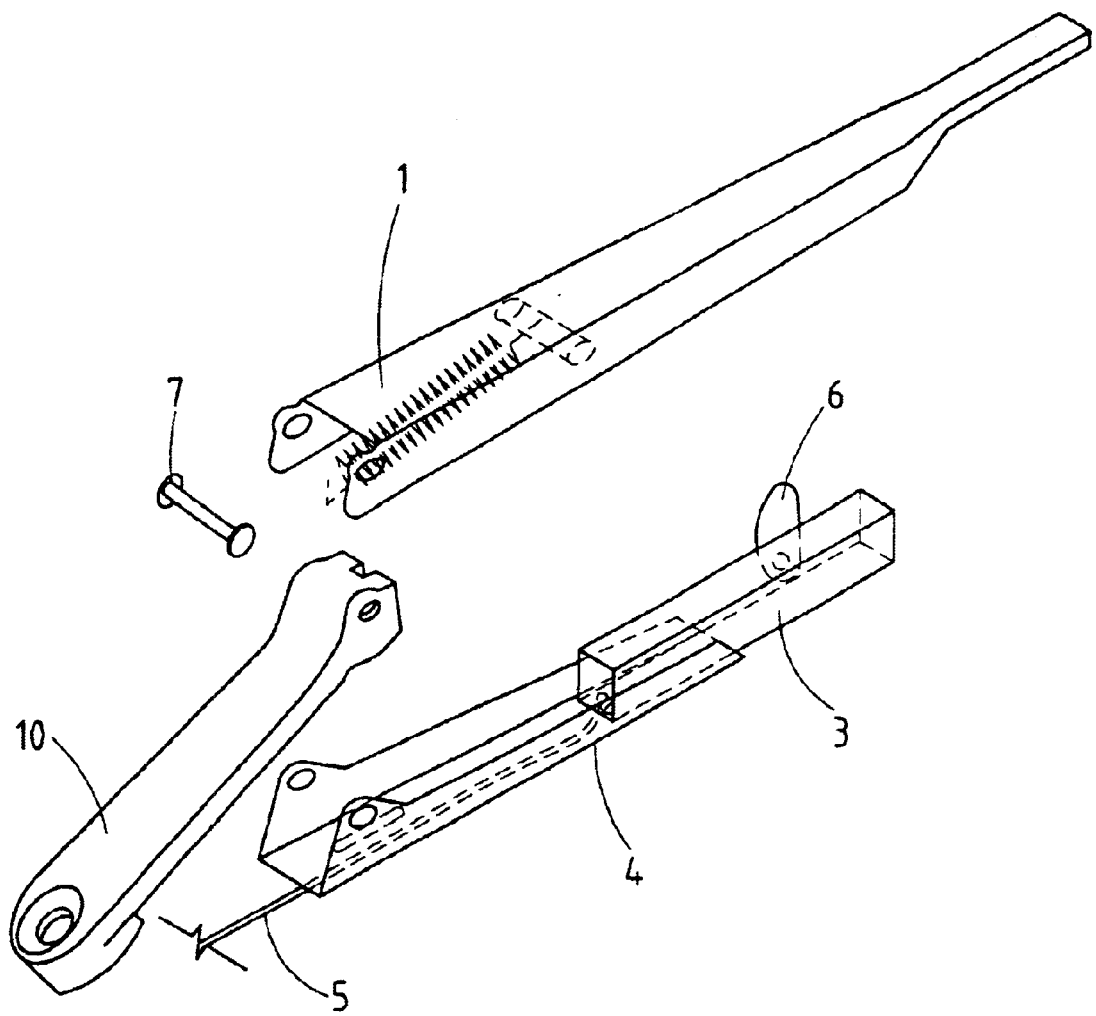
FIG. 4 shows an exploded perspective view of the present invention.
Figure 5:
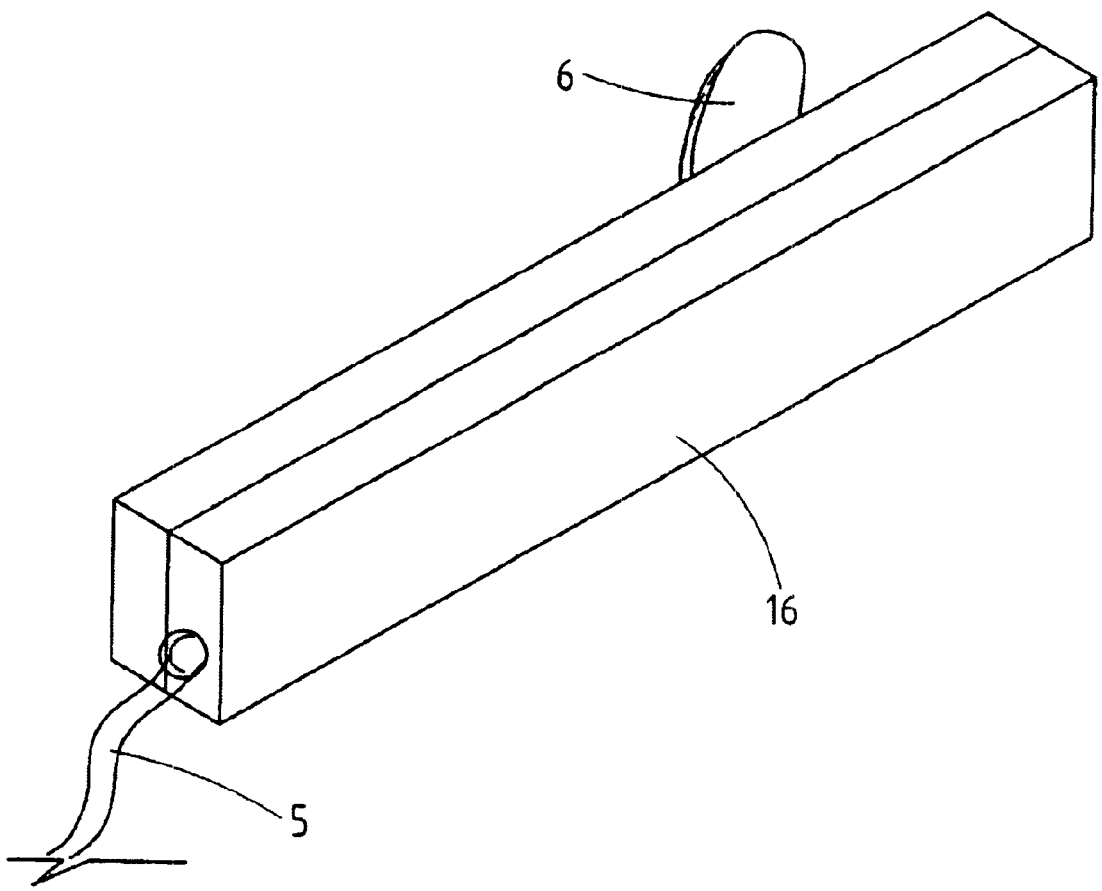
FIG. 5 shows a perspective view of the device of the present invention.
Figure 6:
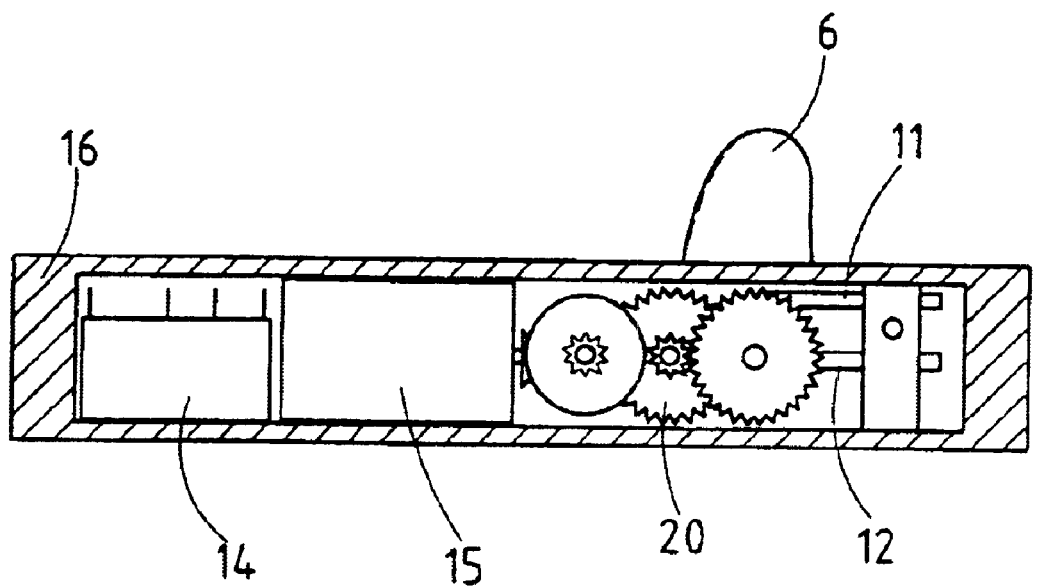
FIG. 6 shows a sectional view of the device of the present invention.
Figure 7:
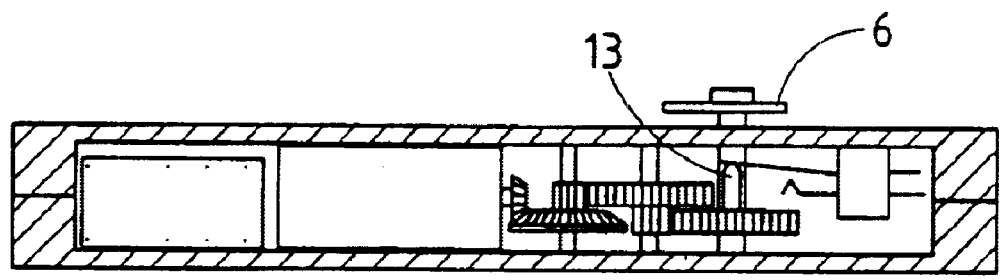
FIG. 7 shows another sectional view of the device of the present invention.
Figure 8:
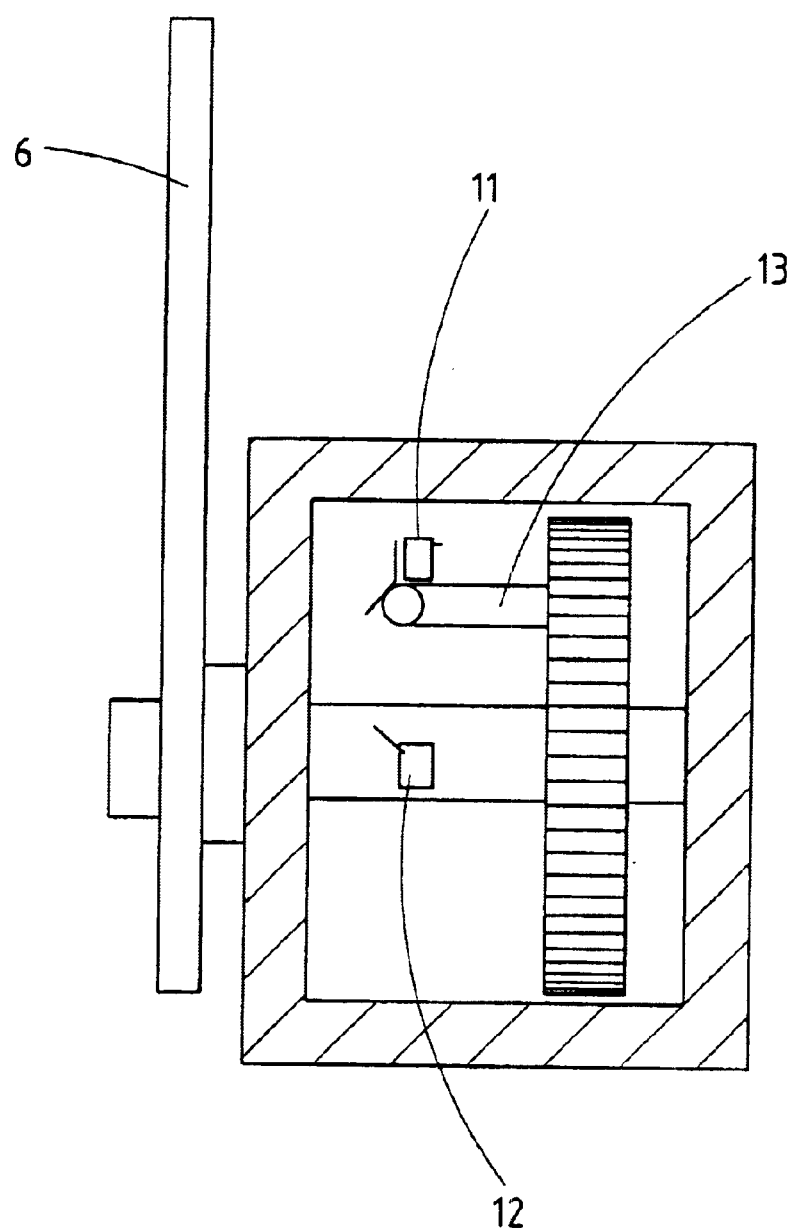
FIG. 8 shows a partial sectional view of the device of the present invention.
Figure 9:
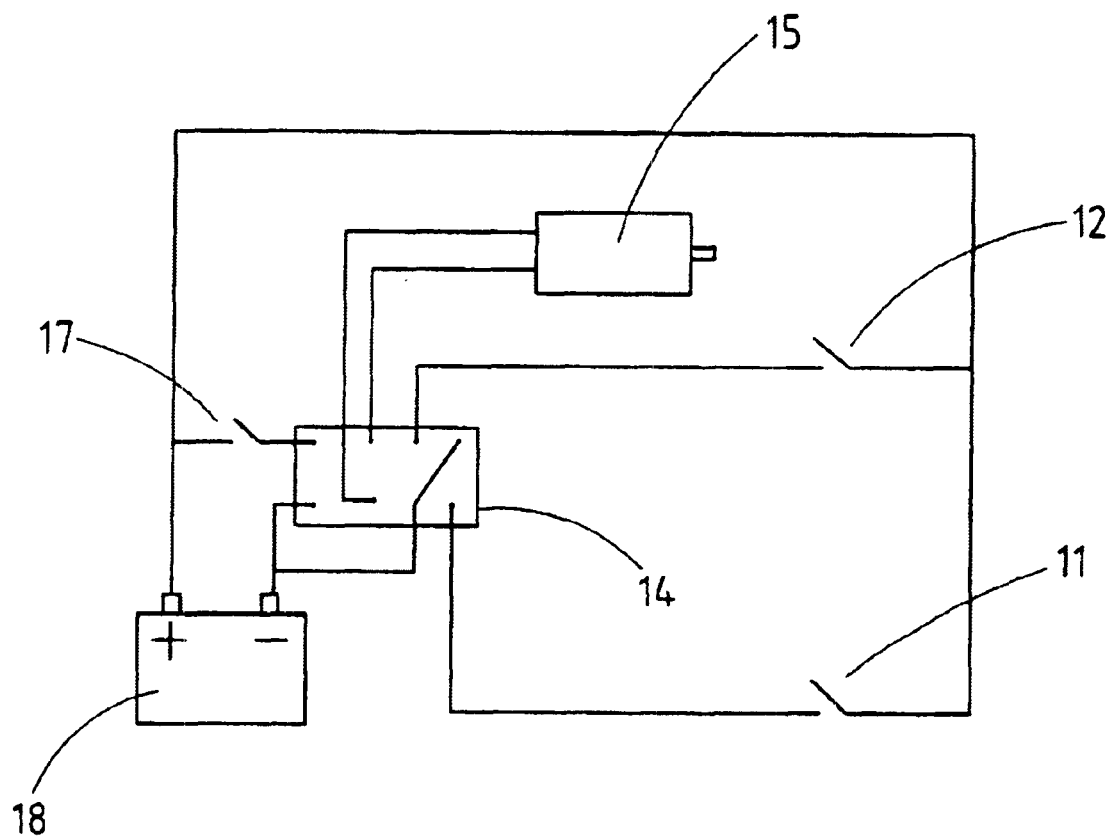
FIG. 9 is a diagrammatic illustration showing a control circuit of the device of the present invention.

When the push rod 6 of the device 3 is in a horizontal position, the windshield wiper arm 1 is in contact with the surface of the windshield of the motor vehicle, as shown in FIG. 2. When the push rod 6 moves in the counterclockwise direction toward the vertical position, as shown in FIG. 3, the push rod 6 raises the windshield wiper arm 1 in the direction away from the windshield such that an exertion point 9 is formed at the end of the push arm 6 urging the interior of the windshield wiper arm 1. In the meantime, a support point 8 is formed at the juncture of the support frame 4 and the windshield wiper base 10 to avert the drooping of the device 3. When the push rod 6 turns clockwise to return to its horizontal position, the windshield wiper arm 1 is forced by the spring force of the spring 2 to return to its original position at which the windshield wiper arm 1 is in contact with the surface of the windshield.

As the windshield wiper arm 1 is pushed up away from the windshield by the push rod 6, the power interruption switch 11 is pushed away by the protruded rod 13 so as to stop the motor 15.

When the starting switch 17 of the motor vehicle is activated, the relay 14 is connected electrically. As a result, the power interruption switch 12 is driven, thereby causing the direct current motor 15 to turn clockwise to actuate the gear set 20, thereby causing the push rod 6 to return to its horizontal position. The windshield wiper arm 1 is thus retracted in place. In the meantime, the switch 12 is pushed away by the protruded rod 13 to ensure that the windshield wiper arm 1 is always in contact with the windshield of the motor vehicle in operation.

When the starting switch 17 of the motor vehicle is deactivated, the relay 14 is electrically disconnected. As a result, the power interruption switch 11 which is connected to a battery 18 is driven, thereby causing the motor 15 to turn counterclockwise to actuate the gear set 20. The push rod 6 is thus turned in the vertical direction to raise the windshield wiper arm 1 which is thus moved away from the windshield. In the meantime, the first power interruption switch 11 is pushed away by the protruded rod 13 so as to make sure that the windshield wiper arm 1 is kept away from the windshield as long as the motor vehicle is not in operation.

We claim:

1. A windshield wiper apparatus for a motor vehicle comprising:

a starting switch having a activated position and a deactivated position;

a windshield wiper having an arm and a base and a support frame and a spring, said support frame being pivotally mounted at one end to said base, said arm being pivotally connected to said base, said spring resiliently mounted to said base and said arm such that said arm is angularly pivotable with respect to said support frame;

a control mechanism cooperatively connected to said arm and retained by said support frame, said control mechanism comprising:

a first power interruption switch;

a second power interruption switch;

a direct current motor electrically connected to said first power interuption switch and to said second power interruption switch;

a gear set drivingly connected to said motor;

a protruded rod drivingly connected to said gear set; and a push rod movable between a first position aligned with said support frame to a second position extending outwardly of said support frame so as to urge said arm and spring pivotally outwardly of said support frame; and a relay means electrically connected to said starting switch so as to be electrically disconnected when said starting switch is in said deactivated position, said relay means connected to said first power interruption switch for causing said first power interruption switch to be driven and for causing said direct current motor to turn counterclockwise so as to actuate said gear set for moving said push rod to said second position, said relay means being electrically connected to said starting switch when said starting switch is in said actuating position, said relay means connected to said second power interruption switch for causing said second power interruption switch to be driven and for causing said direct current motor to turn clockwise so as to actuate said gear set for moving said push rod to said first position such that said spring returns to a position against said support frame, said second power interruption switch being urged by said protruded rod so as to retain said arm against said support frame while said starting switch is in said actuated position.

* * * * *